Dec. 18, 1945.  L. B. McKNIGHT  2,391,178
IDLER ROLL FOR BELT CONVEYERS
Filed March 11, 1943  2 Sheets-Sheet 1

Lynn B. McKnight
INVENTOR.

BY George A. Evans
ATTORNEY.

Dec. 18, 1945. L. B. McKNIGHT 2,391,178
IDLER ROLL FOR BELT CONVEYERS
Filed March 11, 1943 2 Sheets-Sheet 2

Lynn B. McKnight
INVENTOR.

BY George A. Evans
ATTORNEY.

Patented Dec. 18, 1945

2,391,178

UNITED STATES PATENT OFFICE 2,391,178

IDLER ROLL FOR BELT CONVEYERS

Lynn B. McKnight, Milwaukee, Wis., assignor to Chain Belt Company, Milwaukee, Wis., a corporation of Wisconsin Application March 11, 1943, Serial No. 478,761

4 Claims. (Cl. 198—230)

The invention relates to an idler roll such as is used with a belt conveyer, and more particularly, to the return roll used to support the lower or return run of the belt.

In the conventional arrangement of belt conveyers, the upper run of the belt conveys materials, and it may be flat or troughed depending upon the shape or arrangement of the supporting idlers, the purpose of troughing idlers being to increase the carrying capacity of the belt. On the return run, however, the material-carrying side of the belt comes in contact with, and is generally supported by, straight transverse rolls, and with this arrangement there is an opportunity for material which may adhere to the belt to build up on the rolls supporting the return run. The latter condition is most pronounced when the materials are sticky; or where they are moist and outdoors in the winter time, the moist material which collects on the return rolls often freezes and forms rough or uneven humps, thereby promoting quite rapid wear of the belt, especially where the material being handled is of an abrasive nature.

Recently, it has been suggested that a series of spaced discs of suitable diameter might be employed in place of a continuous cylindrical roll in order to reduce the surface upon which such materials might accumulate. One of the drawbacks of this arrangement, however, is that the discs tend to concentrate wear on localized areas of the belt, and if the respective discs on a series of different rolls are spaced in exactly the same manner, the concentration of wear is still more pronounced.

There is another disadvantage with the disc roll, arising from the fact that the belt may and frequently does move from side to side on the idler. Should the belt move sufficiently to one side so that the opposite edge is inside the outermost supporting disc, the latter edge may sag, and then when the belt moves back toward the center of the roll the sagging edge may catch the disc and become frayed or otherwise pinched and damaged. In order to overcome this, the outer discs have been spaced closer together, but this destroys to a large extent the flexing effect which is sought by spacing the areas of contact between the discs and the belts.

Conveyer belts are costly; generally of rubber or rubber covered on the carrying side, 18–48 inches wide and several hundred feet long. Their speed may often range from 250 to 600 feet per minute, and any obstruction to the smooth operation of the belt, or any condition which unduly promotes belt wear is a serious objection.

It is an object of the present invention to provide an idler roll having a greatly reduced surface upon which frozen or sticky material can accumulate, one which will obviate belt creasing and wear along longitudinal lines; and which will induce belt flexing in such a way as to loosen material which might otherwise adhere to the belt. This is accomplished by the provision of spirally arranged circumferential surfaces about the axis of the return roll, the outer margins of which are resilient and yieldable to produce a gentle kneading action along continuously shifting lines diagonally across the belt.

Another object of the invention is to provide an idler roll in which there are spaced areas of contact with the belt, which areas are constantly shifting transversely of the belt while it progresses over a roll and in which the edges of the belt are supported without crimping or pinching effects.

Reference may be had to the accompanying drawings, illustrating several preferred embodiments of the invention, and also several modifications thereof, and in which.

Figure 1:
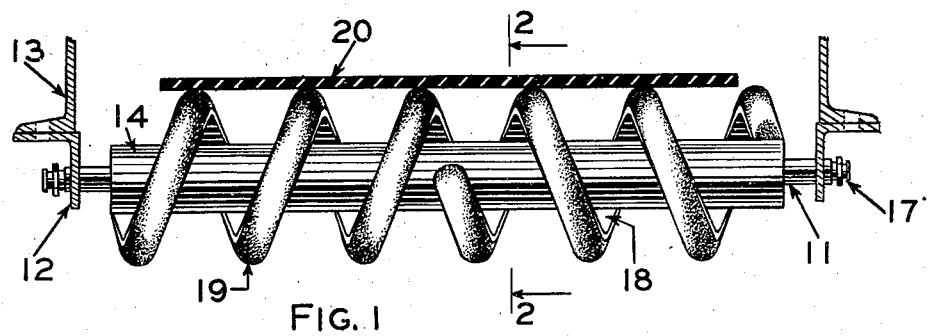
Figure 1 is an elevational view of an idler roll supporting a flat section of the belt.

In the drawings, the numeral 11 indicates a shaft which is disposed beneath the belt and crosswise thereof. Each end of this shaft is rigidly supported by a bracket 12, which may be bolted to the frame 13 of a troughing idler.

or to any other suitable means of support. While not shown in detail on the drawings, a suitable means of anchoring shaft 11 in bracket 12, is to provide notches in the shaft which can be locked in suitable slots in the bracket 12.

Rotatively mounted on shaft 11 is a tube 14 extending for substantially the entire distance between the brackets 12. Disposed between shaft 11 and tube 14 at each end of the assembly is a set of tapered roller bearings protected by a labyrinth seal 16, preferably of the Rex-Stearns type. With this arrangement, grease may be introduced through a fitting 17 at one end of shaft 11, from whence it may communicate with the space between the tube and the shaft, thereby providing lubrication in the bearing and seal at all times. While the roller shaft 14 has been illustrated as being journalled on the fixed shaft 11, the invention is not limited to this particular method of mounting the roller, but can be applied in a construction as subsequently described where the outer tube 14 is integral with the shaft 11, the latter being journalled in bearings retained by the supporting bracket. As hereinafter used, the rotatable portion of this assembly is referred to as the axle and is intended to embrace either of these arrangements.

Mounted on the tubular shell 14 is a spirally disposed rim member 18, which is spaced a constant distance from the axis of the roll. Rim 18 is also spaced a considerable distance from the outer tubular shell 14 so as to increase the effective diameter of the roll, and also to permit shedding of material between the convolutions of the spiral. Spiral 18 may extend for the full length of the roll, or the roll may be composed of two or more such spirals, extending the full length of the roll. As illustrated in Figure 1, where two such segments are illustrated, the pitch of one part is in the opposite direction to the pitch of the other, i. e., one portion is "right hand" and the other "left hand." In either event, the rims are suitably supported on and attached to the tube 14, as by welding or otherwise, at the ends of the spiral sections and preferably in the middle of the spiral in case one continuous spiral should be employed with a wide belt. One of the advantages of having two spirals set at opposite pitch is that they work opposite to each other and tend to maintain the belt centered on the roll.

Figure 2:
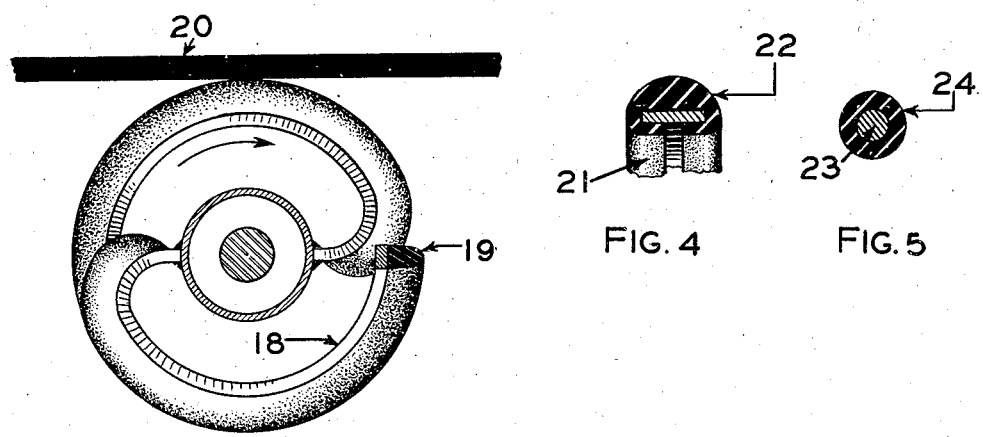
Figure 2 is a section taken on the line 2—2 of Figure 1, showing a section through the roll.

In Figure 2, an arrow is used to indicate the preferred direction of rotation of the idler, in which the areas of contact between the belt and the spiral members are constantly moving outwardly from the center of the belt to the lateral edges, so that should the edges of the belt extend beyond a portion of the spiral in one position of the roll, later as the roll has rotated with the progress of the belt, the overhanging portion is supported by the upwardly moving part of the spiral, thereby avoiding any tendency of the edge of the belt to be scraped or pinched through lateral, intermittent contact with the roll.

Figure 3:
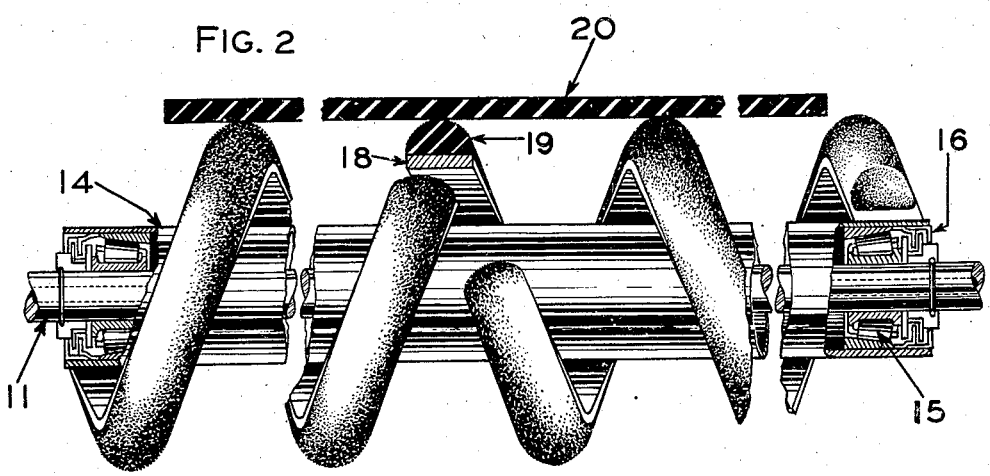
Figure 3 is an enlarged fragmentary view, shown partly in section, of the idler illustrated in Figure 1.

Rim 18 in the form shown in Figure 1 consists of a flat metal bar formed as a helix, with the ends bent in so as to form abutment for welding or other means of securement to the outer side of tubular shell 14. In this form, a band 19 of semi-circular cross section with the convex side outermost made of rubber or similar material is vulcanized, or otherwise firmly secured to the outer side of the spiral rim to form a tread therewith, and the belt 20 rides upon this tread. As will be seen from Figures 1 and 3, there is a greatly reduced surface for contact between the belt 20 and the tread 19, and this contact is constantly shifting transversely of the belt as the latter progresses over the roll. Due to the flexible nature of the tread, there is a lateral flexing action of the belt, and also of the roller tread, which is very effective in cleaning it of material. Flexing of the roller tread has an additional advantage in that it increases the area of contact between the belt and the roller and insures that sufficient force is exerted on the roller by the belt to cause the latter to turn.

Figures 4, 5:
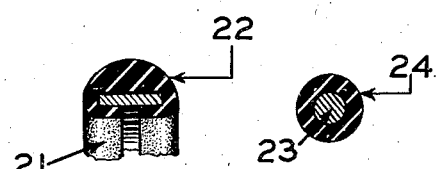
Figure 4 is a modified form of the tire which is mounted on the spiral rim engaging the belt.
Figure 5 is a further modification of the form shown in Figure 4.

In Figure 4, a modified form of tread is illustrated, in which the rubber or other flexible material which is employed may be fitted over the rim 18 so as to more substantially enclose the same. With this construction, it is not necessary to provide as secure a bond between the rim and the tread because of the gripping effect of the overlapping portions 21 on the inner side of the rim and consequently it is easier to replace the rubber band should replacement be necessary. The surface 22 making contact with the belt is crowned and the profile is similar to that shown in Figure 3.

In Figure 5, a still further modification of the tread is illustrated wherein there is shown a rim member 23 which is circular in cross section and completely encased by a flexible tread 24. Still other modifications of the tread form may be employed without departing from the spirit of the invention.

With either form of tread shown, the action of the belt on the rolls is similar. Material which adheres to the load carrying side of the belt has an opportunity to fall through the idler roll rather than to build up thereon, such material as might accumulate on the treads themselves being worked to one side or the other due to the spiral contour and flexible nature of the tread. While the belt has a chance to flex between the treads, there is no continuous creasing action in the belt along longitudinal lines because the points of contact between the belt and the spiral tread are constantly shifting transversely of the belt. This is an important factor in increasing the life of the belt, which is one of the most expensive parts of the conveyer installation.

The space between the areas of contact of the spiral members is important if the belt is to be properly supported and if at the same time there is to be sufficient working of the belt to loosen material adhering to it. Experiments have indicated that the amount of pitch should be many times the width of the area of contact between the spiral tread and the belt. In the drawings the amount of pitch is illustrated as between 3 and 4 times the width of rim 18, and this distance can be increased by employing a plurality of spiral members having a pitch substantially that indicated above, but leaving a gap between some of the innermost spiral segments.

Figure 6:
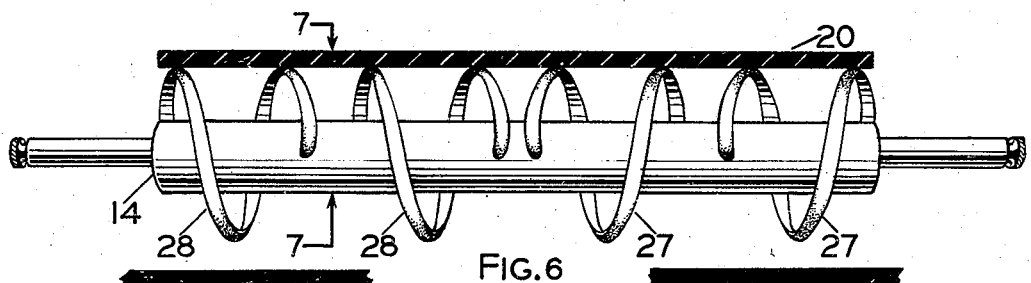
Figure 6 is an elevational view of a modified form of roll in which the belt is supported on spaced spiral segments.
Figure 7:
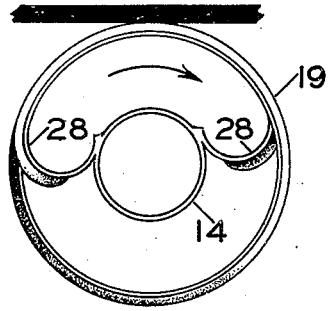
Figure 7 is a section taken on line 7—7 of Figure 6.
Figure 9:
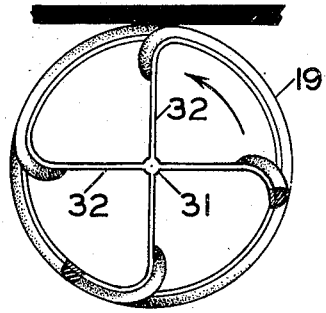
Figure 9 is a section taken on line 9—9 of Figure 8.

In Figure 6 there is shown an arrangement in which the roll 14 is made up of four spiral segments, two left hand and two right hand. The left hand segments 27 and the right hand segments 28 are each one and a half turns long. There is a space of one half turn between the left hand segments and an equal space between the right hand segments, but the lead of each is the same as in the arrangement shown in Figures 1 and 3. At the center of the roll, the two segments are attached to the same side of the roll, but the ends of the left hand segments which are adjacent each other are secured at opposite sides of the roll, as are the adjacent ends of the right hand segments. Consequently as the idler rotates under the weight of the belt, not only do the points of contact shift but the spacing of the points varies depending upon the position of the roll. For instance, when the roll 14 shown in Figure 6 rotates through 180°, there will be only four points of contact instead of eight as in the position shown in the drawings, and the belt may flex to a greater extent than if the distance between the points of contact remained constantly equal to the pitch of the spiral.

Figure 8:
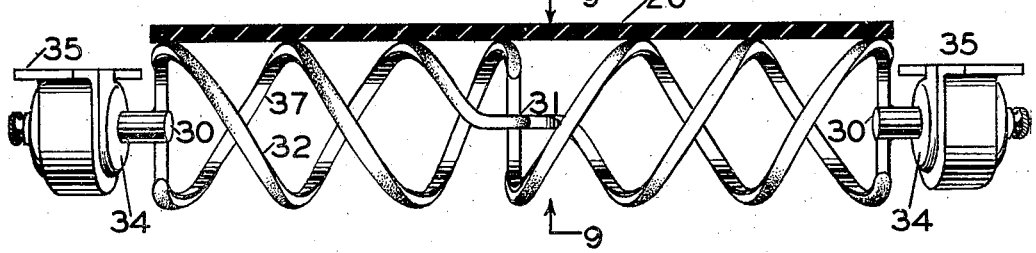
Figure 8 is an elevational view of a roll having a double thread, the spiral portions being axially supported only at the ends of the roll.
Figure 10:
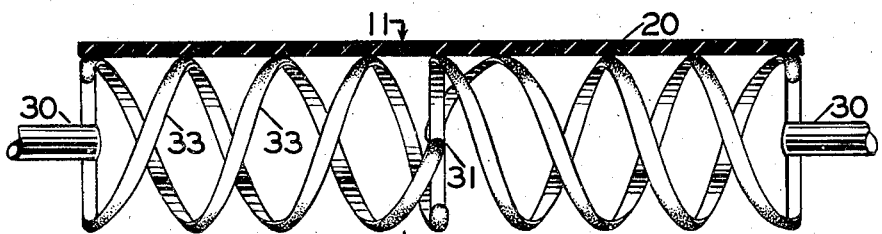
Figure 10 is modification of the form shown in Figure 9.
Figure 11:
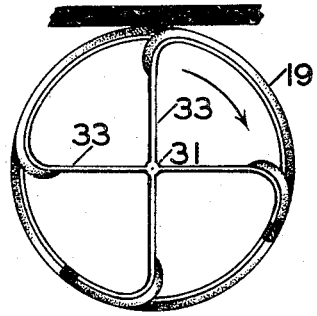
Figure 11 is a section taken on line 11—11 of Figure 10.

In Figures 8 and 10, further modified forms of the invention are illustrated, wherein, instead of having a tubular member 14 extending the full length of the roll, stub shafts 30 are employed at each end, and are each fastened to two spiral segments having the same diameter and pitch. The spiral segments are continuous for the length of the roll but cross at the center so that the direction of pitch may be opposite on the two ends of the roll. By uniting the segments as at 31 in the center of the roll considerable stiffening is obtained and the roll is prevented from sagging under the weight of the belt.

The arrangement shown in Figure 8 differs from that shown in Figure 10 in this further respect that the amount of pitch of the segments shown in Figure 8 is greater than that in Figure 10, there being two complete turns of the segments on either side of the center in the arrangement shown in Figure 8, as compared to 1½ turns in the arrangement shown in Figure 8. With either arrangement however, it is possible to cross the segments at the center and secure them together by appropriate means.

Where the rolls are supported by stub shafts 30 made integral with the spiral segments, the shafts are journalled in bearings 34 mounted on brackets 35 secured to the conveyer frame. This arrangement is illustrated in Figure 8, and as previously stated similar bearings might be employed with the roll shown in Figure 1 instead of locking the bearing in the tube 14 in the manner shown in the latter figure.

In each of these arrangements it is desirable that the direction of pitch of the two outer spirals be such that when the idler is rotated the areas of contact move outwardly, thereby protecting the marginal edges of the belt from pinching action.

The forms of the invention described and illustrated are intended to be preferred embodiments only of the same, and variations in the form and arrangements of the elements may be resorted to without departing from the scope of the invention, provided they fall within the purview of the following claims.

The invention having been described, what is claimed is:

1. An idler roll for supporting a conveying belt in its return path, comprising a rotatably mounted rigid spiral member, with its axis arranged transversely of the belt, a spiral tread mounted on said member, said tread being of yieldable material and having an outer surface adapted to support a small area of the underside of the belt, the movement of the belt effecting flexing of the tread under the transverse as well as longitudinal forces which the belt exerts, whereby adequate traction is obtained to compel rotation of the roll at all times, the areas of contact between the belt and the roll constantly shifting both longitudinally and transversely of the belt to produce substantially uniform wear over the entire undersurface of the belt supported by the spiral tread.

2. An idler roll for supporting a conveying belt in its return path, comprising a rotatably mounted rigid spiral member, with its axis arranged transversely of the belt, a spiral tread mounted on said member, said tread being of yieldable material and having an outer surface adapted to support a small area of the underside of the belt, the space between the spiral convolutions being of the order of about three or more times the width of the tread to permit shedding of material therebetween and the movement of the belt effecting flexing of the tread under the transverse as well as longitudinal forces which the belt exerts, whereby adequate traction is obtained to compel rotation of the roll at all times, the areas of contact between the belt and the roll being constantly shifting both longitudinally and transversely of the belt to produce substantially uniform wear over the entire undersurface of the belt supported by the spiral tread.

3. An idler roll for supporting a conveyer belt in its return path, comprising a plurality of balanced opposing spiral members of rigid construction, said members having a common axis arranged transversely of the belt, a spiral tread mounted on said members, said tread being of yieldable material and having an outer surface adapted to support the belt in spaced areas, the end spirals being disposed in a direction relative to the direction of movement of the belt to effect a lifting of the edges of the belt away from abutting contact with tread portions of the roll, the movement of the belt producing flexing of the tread under the transverse as well as longitudinal forces which the belt exerts, thereby providing adequate gripping action between the belt and the roll to compel constant rotation of the roll and cleaning of the belt of material adhering thereto.

4. An idler roll for supporting a conveyer belt in its return path, comprising a plurality of balanced opposing spiral members of rigid construction, said members having a common axis arranged transversely of the belt, a spiral tread mounted on said members, said tread being of yieldable material and having an outer surface adapted to support the belt in areas spaced apart by a distance of the order of about three or more times the width of the tread, the end spirals being disposed in a direction relative to the direction of movement of the belt to effect a lifting of the edges of the belt away from abutting contact with tread portions of the roll, the movement of the belt producing flexing of the tread under the transverse as well as longitudinal forces which the belt exerts, thereby providing adequate gripping action between the belt and the roll to compel constant rotation of the roll and cleaning of the belt of material adhering thereto.

LYNN B. McKNIGHT.